United States Patent [19]
Wolf et al.

[11] Patent Number: 5,590,226
[45] Date of Patent: Dec. 31, 1996

[54] INTEGRATED OPTICAL BRANCHING ARRANGEMENT AND METHOD USING SAME

[75] Inventors: Barbara Wolf, Kronau; Norbert Fabricius, Hockenheim, both of Germany

[73] Assignee: IOT Integrierte Optik GmbH, Jena

[21] Appl. No.: 441,463

[22] Filed: May 15, 1995

[30] Foreign Application Priority Data

May 20, 1994 [DE] Germany ........................ 44 17 698.8
Feb. 24, 1995 [EP] European Pat. Off. ............ 95102653

[51] Int. Cl.⁶ ............................. G02B 6/26; H01L 21/70
[52] U.S. Cl. ................... 385/45; 385/14; 385/15; 385/43; 385/132; 437/20; 437/51
[58] Field of Search ...................... 385/14, 15, 16, 385/24, 27, 28, 39, 40, 43, 44, 45, 46, 48, 50, 140, 129, 130, 131; 437/15, 20, 21, 22, 36, 51

[56] References Cited

U.S. PATENT DOCUMENTS

| | | | |
|---|---|---|---|
| 4,515,428 | 5/1985 | Findakly | 385/42 X |
| 5,151,957 | 9/1992 | Riviere | 385/41 |
| 5,185,828 | 2/1993 | van der Tol | 385/28 |
| 5,243,669 | 9/1993 | Alferness et al. | 385/11 |
| 5,247,594 | 9/1993 | Okuno et al. | 385/17 |
| 5,557,557 | 12/1985 | Gleason et al. | 385/140 X |

FOREIGN PATENT DOCUMENTS

| | | | |
|---|---|---|---|
| 0476384 | 3/1992 | European Pat. Off. | 385/14 X |
| 2916961 | 11/1980 | Germany | 385/45 X |
| 3107112 | 9/1982 | Germany | 385/14 X |
| 3804330 | 8/1989 | Germany | 385/14 X |
| 4-131806 | 5/1992 | Japan | 385/14 X |

OTHER PUBLICATIONS

"Minimum Bending Loss Interconnection for Integrated Optics Waveguides" by L. Lerner, Electronics Letters, vol. 29, No. 9, Apr. 29, 1993, pp. 733 and 734.

"Curved dielectric optical waveguides with reduced transition losses" by E. Neumann, IEE Proceedings, vol. 129, Pt. H, No. 5, Oct. 1982, pp. 278 to 280.

*Primary Examiner*—Brian Healy
*Attorney, Agent, or Firm*—Walter Ottesen

[57] ABSTRACT

Integrated optical branching arrangement has a monomode waveguide 1 and a Y-branch waveguide 2. The waveguides conjointly define an abutting junction having a lateral offset (d). This is particularly advantageous when curved monomode waveguides are used. The offset is suitable for setting the power distribution ratio. The integrated optical branching arrangement can be applied to ion-exchanged devices in glass and to wavelength multiplexers.

15 Claims, 2 Drawing Sheets

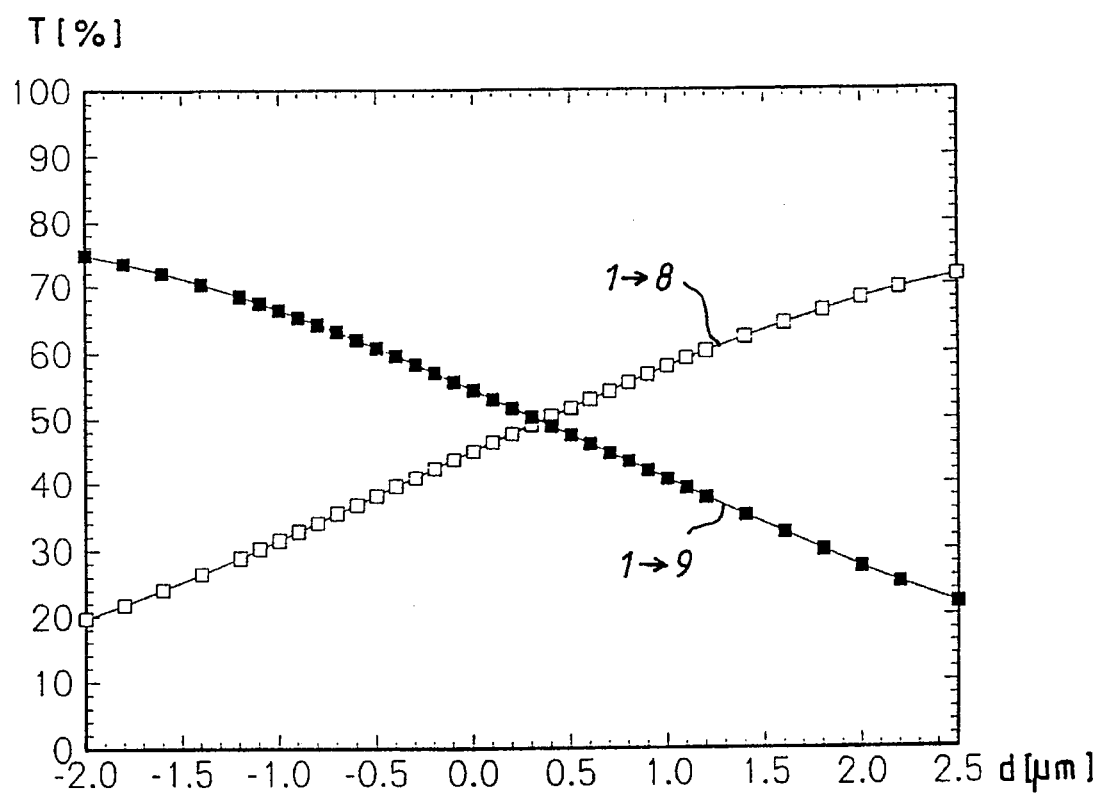

INTEGRATED OPTICAL BRANCHING ARRANGEMENT AND METHOD USING SAME

FIELD OF THE INVENTION

The invention relates to an integrated optical branching arrangement which includes a monomode waveguide and a Y-branch. The waveguide and the Y-branch have a depth and width of a few micrometers and are preferably produced by ion exchange in glass.

BACKGROUND OF THE INVENTION

In telecommunications technology, such arrangements are integrated in 1×N, for example, 1×16, branching structures on individual chips having a length of approximately 30 mm. Minimum power losses and a high degree of uniformity in the power distribution to the various outlets are required, on the one hand, and, on the other hand, a high level of integration within a small area is necessary. The latter requires the smallest possible radii of curvature of the waveguides and a large number of curved junctions, both being factors which increase power losses. To achieve uniformity of power distribution, the elementary Y-branches, including the preceding conductor section, must conventionally be structured as symmetrically as possible, which makes curvature conditions even more difficult.

German patent publication 2,916,961 describes a branch for multimode light-guiding fibers having a typical diameter of 80 μm where light-guiding fibers are mutually abutting. The geometrical transmission coefficients from the incoming fiber to the continuing fiber and the branching fiber are obtained as a ratio of the overlapping areas of the fiber cores to the entire core surface of the incoming fiber (FIG. 4). Wave-optical effects are of no significance in thick multimode fibers and the possible curvature of the incoming fiber is likewise of no significance. The offset is provided at the branching location and not at a preceding junction between an input waveguide (especially a curved input waveguide) and the branching component.

It is known from German Patent 3,107,112 and the article entitled "Curved dielectric optical waveguides with reduced transition losses" by E. Neumann, IEE Proc., Vol. 129, Pt. H., No. 5, October 1982, pages 278 to 280, that the losses in the junctions between waveguides with different curvatures can be reduced by lateral offset. This is explained by the fact that the maximum of the fundamental mode of a wave travelling in a waveguide moves to the periphery when the radius in the waveguide decreases. The offset of the waveguides permits compensation of the resulting mode mismatch in the junctions between waveguides of different curvatures. Slab waveguides, strip waveguides and fibers are given as examples.

The foregoing is also described in Japanese patent publication 4-131806 where a contactless 2×2 coupler with etched, sharp-cornered strip waveguides is used as an example. This is also shown in FIG. 20 of U.S. Pat. No. 5,247,594. U.S. Pat. No. 5,247,594 also makes reference to ion-diffused glass waveguides.

SUMMARY OF THE INVENTION

It is the object of the invention to provide an arrangement which allows the power distribution ratio to be set systematically and, in particular, uniformly (1:1).

This object is achieved by an arrangement according to the invention wherein the Y-branch is abutted with lateral offset to a waveguide.

Surprisingly, it was found that the known measure of reducing losses by lateral offset can also be used to set the distribution ratio as desired if it is implemented on the junction of a Y-branch.

This is particularly surprising when the waveguides are produced by ion exchange since they do not have sharp corners and the offset does not represent an abrupt change either, even when the lithographic masks used for fabrication have an abrupt offset. The Y-branching component itself remains unchanged according to the invention.

It was noted in particular that, even with waveguides having slight curvature, the compensation of the mode field mismatch has a beneficial effect on the uniformity of the downstream Y-branch, even if the losses described by Neumann in the above paper are negligible. Compensation is especially important in structures of cascaded branching devices because nonuniformity increases exponentially. For example, a 49:51 ratio in a 1×32 branch results in a transmission difference of 22%. In the case of cascaded branches it is important to also compensate the mode field mismatch behind the individual Y-branch, since transients, which affect the uniformity of the succeeding branches, can be detected in integrated optical structures over distances of several millimeters.

Lateral offset is particularly beneficial if the preceding waveguide is curved, since then it will also be possible to provide uniform power distribution to the two outlets.

In combination with the use of the lateral offset for all junctions between different curvatures, 1×N branches, which are composed of several Y-branches, can be constructed such that they are particularly compact, of low loss and uniform. Only the junction from a straight input waveguide to the first Y-branch usually remains without lateral offset.

Further advantages result when an ion exchange using a lithographic mask having an abrupt offset is used for the production. The line width of the mask preferably lies below 2 μm while, however, the half-width value of the waveguides is two times to four times this amount. The waveguides then form continuous, and not abrupt, junctions. The waveguides are monomode waveguides where the extensions of the mode field and of the waveguide are approximately identical and the coupling of the mode fields at the junctions is of critical importance.

This results in the particularly advantageous procedure for the setting of the power distribution ratio.

BRIEF DESCRIPTION OF THE DRAWINGS

The invention will now be described with reference to the drawings wherein:

FIG. 2 is a graph showing the transmission into the two outlets of a Y-branch downstream of an arc as a function of the offset. The corresponding power loss is also plotted.

DESCRIPTION OF THE PREFERRED EMBODIMENTS OF THE INVENTION

Figure 1:
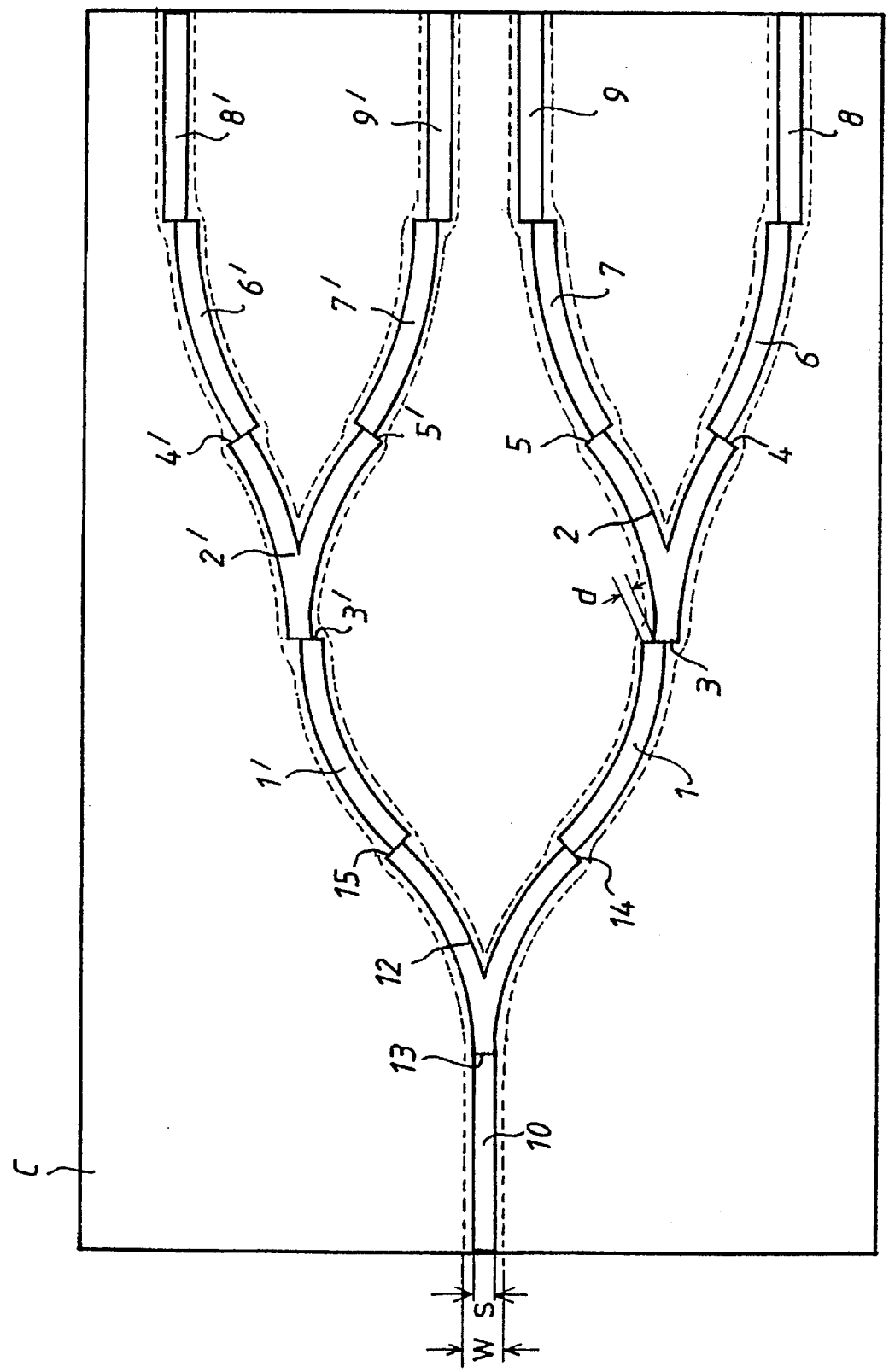
FIG. 1 shows the schematic design of a 1×4 branch.

The solid lines in FIG. 1 represent the shape of the lithographic mask (line width=s), and the dotted lines represent the half-width value (w) of the refractive index profile. The sketch is qualitative and not true to scale. In FIG. 1, a Y-branch 2 is arranged on the integrated optical chip C and is preceded by a curved waveguide 1. According to the invention, a lateral offset (d) of the waveguide structure is provided at the junction 3 between the waveguide 1 and the Y-branch 2. To achieve a uniform power distribution to the two outlets 4 and 5 of the Y-branch 2, the offset is directed towards the outside of the arc. Parts 1' to 5' are arranged symmetrically to parts 1 to 5 on the chip C.

The waveguides (1, 1') are connected symmetrically to outlets (14, 15) of a first Y-branch 12, A straight waveguide 10 runs from the input edge of the chip C to the Y-branch 12. Here, no lateral offset is provided at junction 13 because the mode distribution is centered in the straight waveguide 10. However, if a nonuniform power distribution to outlets (14, 15) is required, a lateral offset can also be provided at junction 13.

The Y-branches (2, 2', 12) are identical and the branches (2, 2') in particular are configured symmetrically. The radii of curvature in branches (2, 2', 12) measure 100 mm; therefore, the distance of the wedge of the production mask from junctions (3, 3') with the offset is more than 400 μmm To obtain a 1×4 branch chip with parallel outlets, arcuate waveguides (6, 7, 6', 7') and straight waveguides (8, 9, 8', 9') have been abutted to outlets (4, 5, 4', 5').

To minimize attenuation, a lateral offset according to German Patent 3,107,112 is provided at all junctions (14, 15, 4, 5, 4', 5') between differently curved waveguides, including the junctions between arcuate waveguides (6, 7, 6', 7') and straight waveguides (8, 9, 8', 9').

The optimum offset (d) between curved waveguide 1 and Y-branch 2 can be calculated for a given branch geometry and a defined radius of curvature by means of simulation computations.

The table includes the calculated standardized output powers of the Y-branches $l_1$ and $l_2$ and the resulting uniformity u, defined as follows: u=−10·(log ($l_1$)−log ($l_2$)).

The waveguide 1 corresponds to the standard of a waveguide produced by ion exchange in glass such as that used for telecommunication applications. The line width of the mask for production is approximately 1.5 μm, the half-width of the refractive index profile is approximately 5 μm. The half-width value of the monomode field is also approximately 5 μm. The waveguide (and the Y-branch) can lie on the surface of the glass substrate or be formed as a buried waveguide.

Table 1 shows an example for the radius of curvature 40 mm of the waveguide 1.

TABLE 1

| d (μm) | wavelength 1.31 μm | | | wavelength 1.55 μm | | |
|---|---|---|---|---|---|---|
| | $l_1$ | $l_2$ | u[dB] | $l_1$ | $l_2$ | u[dB] |
| 0.0 | .506 | .486 | 0.18 | .465 | .533 | 0.59 |
| 0.1 | .501 | .491 | 0.09 | .474 | .524 | 0.44 |
| 0.2 | .496 | .496 | 0.00 | .483 | .515 | 0.28 |
| 0.3 | .491 | .501 | 0.09 | .492 | .506 | 0.12 |
| 0.4 | .486 | .506 | 0.18 | .501 | .496 | 0.04 |
| 0.5 | .481 | .510 | 0.25 | .509 | .487 | 0.19 |

This means that the optimum offset (d) lies between 0.2 and 0.4 μm, depending on the wavelength used. The very significant improvement in uniformity achieved by the use of such an offset is clearly realized. With a mean offset of 0.3 μm, for example, uniformity can be reduced from 0.18 dB to 0.09 dB for the wavelength 1.31 μm and, simultaneously, from 0.59 dB to 0.12 dB for the wavelength 1.55 μm.

This means that the arrangements described are suitable for dual-wavelength multiplex operation.

For an arrangement according to FIG. 1 and with the dimensions mentioned above, but with a radius of curvature of 30 mm for waveguide 1, FIG. 2 shows the portion T of power coupled into output waveguides 8 and 9 by input waveguide 1 at the branch 2 as a function of offset (d). The offset towards the inner side of the arc of the input waveguide 1 is given as a negative value. This data applies to the wavelength 1.31 μm.

At the junction of the curves, that is, with uniform power distribution and an offset of +0.35 μm, the losses are also negligibly low. In the entire area shown, the loss L, which increases towards the edges, remains low. In contrast, German patent publication 2,916,961 mentioned above shows that the loss is at its highest with equal distribution and reaches 20%.

FIG. 2 also shows that the lateral offset (d) is also suitable for setting the power distribution ratio of Y-branch 2 within wide limits. Changes in the geometry of the Y-branches are therefore largely superfluous.

It is understood that the foregoing description is that of the preferred embodiments of the invention and that various changes and modifications may be made thereto without departing from the spirit and scope of the invention as defined in the appended claims.

What is claimed is:

1. An integrated optical device comprising:

at least one Y-branch waveguide;

a plurality of monomode waveguides;

said monomode waveguides being optically connected to said Y-branch waveguide;

at least one of said monomode waveguides and said Y-branch waveguide conjointly defining an abutting junction having a lateral offset (d);

said one Y-branch waveguide having an input end and two output ends;

said input end having an input cross section and each of said two output ends having a cross section; and, all of said cross sections being equal to each other.

2. The integrated optical device of claim 1, further comprising:

a carrier; and, said waveguides being formed in said carrier by an ion exchange.

3. The integrated optical device of claim 2, said carrier being a glass substrate.

4. An integrated optical device comprising:

at least one Y-branch waveguide;

a plurality of monomode waveguides;

said monomode waveguides being optically connected to said Y-branch waveguide;

at least one of said monomode waveguides and said Y-branch waveguide conjointly defining an abutting junction having a lateral offset (d); and, said one monomode waveguide being an arcuate monomode waveguide.

5. The integrated optical device of claim 1, each two of said waveguides conjointly defining a junction and a selected number of said junctions being defined by two waveguides of respectively different curvatures; and, said selected number of junctions each having a lateral offset (d).

6. The integrated optical device of claim 5, the junctions having a lateral offset forming continuous transitions.

7. The integrated optical device of claim 1, said Y-branch waveguide having an inlet end and an other one of said waveguides and said Y-branch waveguide conjointly defining a junction at said inlet end having a lateral offset (d).

8. A method of making an integrated optical device which includes at least one Y-branch waveguide and a plurality of monomode waveguides, each two mutually abutting ones of said waveguides defining a junction, the method comprising the steps of:

providing a lithographic mask having a line structure formed therein defining said waveguides and having abrupt lateral offsets (d) at selected ones of the junctions;

applying said lithographic mask to a substrate; and, generating said waveguides in said carrier with an ion exchange.

9. The method of claim 8, wherein said line structure of said mask has a line width (s) of less than 2 μm; and, said waveguides have a half width (w) which is two to four times said line width (s).

10. A method of setting the power distribution ratio of an integrated optical device the method comprising the steps of:

arranging a Y-branch waveguide subsequently to a monomode input waveguide by an abutting junction by setting a lateral offset (d) at the abutting junction between the input waveguide and the Y-branch waveguide.

11. The integrated optical device of claim 4, further comprising:

a carrier; and, said waveguides being formed in said carrier by an ion exchange.

12. The integrated optical device of claim 11, said carrier being a glass substrate.

13. The integrated optical device of claim 4, each two of said waveguides conjointly defining a junction and a selected number of said junctions being defined by two waveguides of respectively different curvatures; and, said selected nurser of junctions each having a lateral offset (d).

14. The integrated optical device of claim 13, the junctions having a lateral offset forming continuous transitions.

15. The integrated optical device of claim 4, said Y-branch waveguide having an inlet end and another one of said waveguides and said Y-branch waveguide conjointly defining a junction at said inlet end having a lateral offset (d).

* * * * *

UNITED STATES PATENT AND TRADEMARK OFFICE
CERTIFICATE OF CORRECTION

PATENT NO. : 5,590,226

DATED : December 31, 1996

INVENTOR(S) : Barbara Wolf and Norbert Fabricius

It is certified that error appears in the above-identified patent and that said Letters Patent is hereby corrected as shown below:

In column 3, line 22: delete "µmm" and substitute -- µm. -- therefor.

In column 3, line 37: delete "10.(log" and substitute -- 10·(log -- therefor.

In column 5, line 23: between "device" and "the" insert -- , -- .

In column 6, line 17: delete "nurser" and substitute -- number -- therefor.

Signed and Sealed this

Fifteenth Day of April, 1997

*Attest:*

BRUCE LEHMAN

*Attesting Officer*  *Commissioner of Patents and Trademarks*